United States Patent [19]

Rauh et al.

[11] 4,388,384
[45] Jun. 14, 1983

[54] PHOTOELECTROCHEMICAL CELL

[75] Inventors: R. David Rauh, Newton; Robert A. Boudreau, Norton, both of Mass.

[73] Assignee: EIC Laboratories, Inc., Newton, Mass.

[21] Appl. No.: 280,450

[22] Filed: Jul. 6, 1981

[51] Int. Cl.³ ............................................. H01M 6/36
[52] U.S. Cl. .................................................... 429/111
[58] Field of Search ......................................... 429/111

[56] References Cited

U.S. PATENT DOCUMENTS

| | | | |
|---|---|---|---|
| 3,925,212 | 12/1975 | Tchernev | 250/527 |
| 4,061,555 | 12/1977 | Miyatani et al. | 204/242 |
| 4,064,326 | 12/1977 | Manssen et al. | 429/111 |
| 4,117,210 | 9/1978 | Deb et al. | 429/111 |
| 4,124,464 | 11/1978 | Miyatani et al. | 204/129 |
| 4,172,925 | 10/1979 | Chen et al. | 429/111 |
| 4,182,796 | 1/1980 | Heller et al. | 429/111 |

OTHER PUBLICATIONS

Gerard et al., "Design Considerations for Semiconductor-Electrolyte Solar Cells", 2d Int'l Conference on the Photochemical Conversion and Storage of Solar Energy, pp. 128-130, (1978).
Deb et al., "Status of Non-Silicon Photovoltaic Cell Research", SPIE vol. 248 Role of Electro-Optics in Photovoltaic Energy Conversion, pp. 38-56, (1980).
Hodes et al., "Electrocatalytic Electrodes for the Polysulfide Redox System", J. Electrochem. Soc.: Electrochemical Science and Technology, vol. 127, No. 3, (1980).

Primary Examiner—Aaron Weisstuch

[57] ABSTRACT

A photoelectrochemical cell comprising a sealed container having a light-transmitting window for admitting light into the container across a light-admitting plane, an electrolyte in the container, a photoelectrode in the container having a light-absorbing surface arranged to receive light from the window and in contact with the electrolyte, the surface having a plurality of spaced portions oblique to the plane, each portion having dimensions at least an order of magnitude larger than the maximum wavelength of incident sunlight, the total surface area of the surface being larger than the area of the plane bounded by the container, and a counter electrode in the container in contact with the electrolyte.

5 Claims, 4 Drawing Figures

PHOTOELECTROCHEMICAL CELL

The government has rights to this invention pursuant to Subcontract XP-9-8002-7 from the Solar Energy Research Institute.

BACKGROUND OF THE INVENTION

This invention relates to photoelectrochemical cells. Such cells typically have a photoelectrode consisting of light-absorbing semiconductor material coated on a planar substrate, a counter electrode, and a redox electrolyte.

Heller et al. U.S. Pat. No. 4,182,786 describes a cell in which the photoelectrode substrate is texturized to produce hillocks having dimensions comparable to the wavelength of the incident light, said to improve cell performance.

SUMMARY OF THE INVENTION

The invention provides a cell with highly efficient conversion of light electrical energy, excellent mixing of the electrolyte to minimize polarization during operation, and a high degree of exposure of photoelectrode surface area to incident light. The cell is simple and inexpensive to make in a variety of compact shapes.

In general, the invention features a cell having a sealed container having a light-transmitting window for admitting light into the container across a light-admitting plane, an electrolyte in the container, a photoelectrode in the counter having a light-absorbing surface arranged to receive light from the window and in contact with the electrolyte, and a counter electrode in the container in contact with the electrolyte, the light absorbing surface having a plurality of spaced portions oblique to the light-admitting plane, each portion having dimensions at least an order of magnitude larger than the maximum wavelength of incident sunlight, the total surface area of the light absorbing surface being larger than the area of the light-admitting plane bounded by the container.

In some preferred embodiments the photoelectrode is louvered to provide the oblique portions and corresponding ion-flow openings, the oblique portions having more surface area than the openings.

In other preferred embodiments the counter electrode is laminated to the photoelectrode with electrical insulation in between, and some of the oblique portions face the counter electrode sections laminated to other oblique portions.

In yet other preferred embodiments the light absorbing surface is undulating and the counter electrode has portions transverse to the light-admitting plane which extend toward the window through openings in the photoelectrode.

Other advantages and features of the invention will be apparent from the following description of preferred embodiments thereof.

DESCRIPTION OF THE PREFERRED EMBODIMENTS

We turn now to the structure and operation of the preferred embodiment, first briefly describing the drawings thereof.

STRUCTURE AND MANUFACTURE

Figure 1:
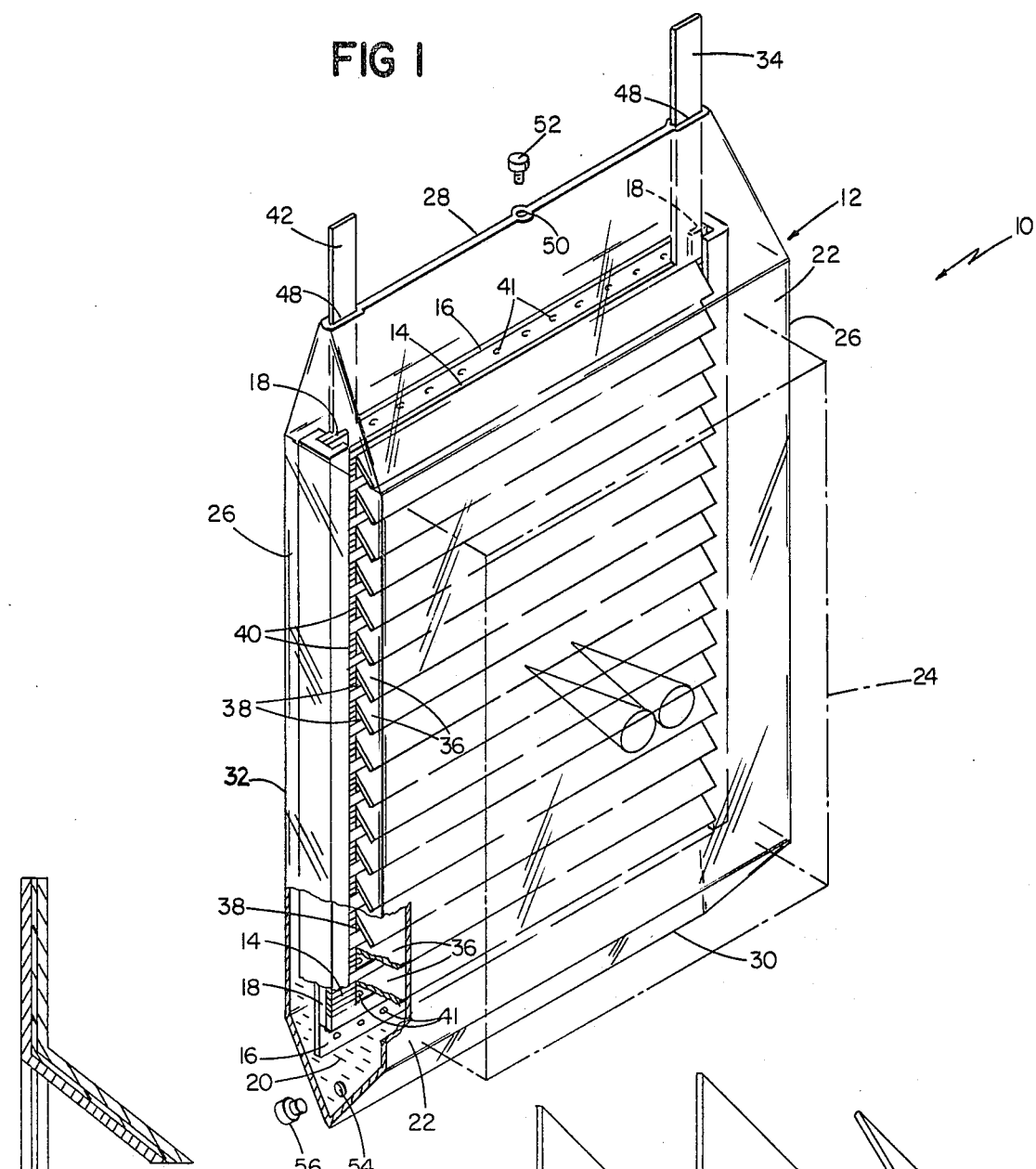
FIG. 1 is an isometric view of a cell embodying the invention.

Referring to FIG. 1, photoelectrochemical cell 10 has a sealed container 12 containing a photoelectrode 14, a counter electrode 16, insulating spacers 18, and electrolyte 20.

The container is constructed of ⅛" sheet polymethylmethacrylate (Plexiglass). The container has a light-transmitting window 22 for admitting light into the container across a light-admitting plane 24. Side walls 26, top 28, bottom 30, and backwall 32 are also Plexiglass.

Photoelectrode 14 is constructed from 0.25 mm Grade 2 ASTM titanium foil, 9.0×11.2 cm wide with a 5 cm long×0.5 cm wide contact strip 34 extending from the top corner of the titanium substrate. Sixteen louvers 36 are die-stamped equally spaced along the long dimension of the Ti substrate, and bent up at an angle of 40° from the electrode plane, which creates openings 38 for ion flow. The louvers are made larger in surface area than are the adjacent openings by crimping the foil support frame sides 40 adjacent each louver to decrease the height of opening 38.

A film of n-CdSe is chemically deposited onto the substrate, to a thickness of about 2 microns, and then heat treated and chemically etched for activation. The back side of the electrode is passivated with a clear acrylic coating to minimize dark leakage currents which oppose the photocurrent under cell operation.

Counter electrode 16, also 9.0×11.2 cm with contact strip 42, consists of cobalt sulfide deposited onto 8 mil stainless steel foil. About 200 equally spaced holes 41, 0.2 cm in diameter, are provided in the counter electrode to allow ion flow, thus increasing its active area and reducing counter electrode polarization losses.

Spacers 18, which separate the counter and photo/electrodes and space the counter electrode from the back wall are built into the side walls of the container and constructed of Plexiglass.

The cell top 28 has slots 48 for the electrode contact strips 34 and 42. A threaded center hole 50 is provided for filling the cell with electrolyte.

The container is assembled using $CH_2Cl_2$ cement. First, the sides and bottom are assembled and the electrodes are inserted into the cell, retained by slots in the side walls. The top is cemented in place with the contact strips inserted through the slots. The area around electrode strips 34 and 42 is filled with epoxy cement to prevent leakage.

The electrolyte, consisting of 1 M $K_2S$, 1 M S, and 1 M KOH dissolved in distilled water, is introduced through the fill hole 50, and the fill hole is then sealed with a Teflon screw 52. The electrolyte may be removed or flowed over the electrodes through drain hole 54 which is sealed with a removable plug 56.

Figure 2:
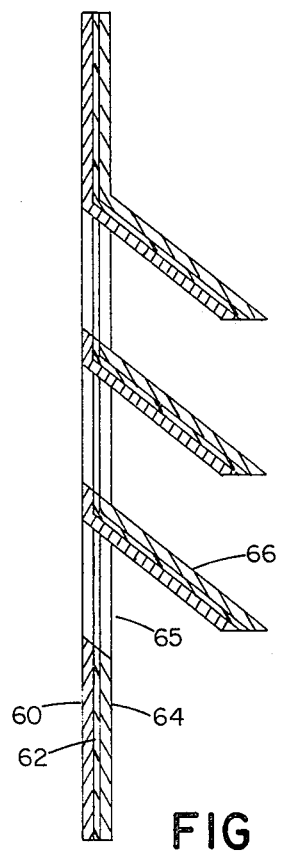
FIG. 2 is a sectional view showing the electrodes of another embodiment of the invention.

FIG. 2 shows an alternate construction for the electrodes in which the counter electrode 60 is laminated to the photoelectrode 64 with an insulating layer 62 in between to prevent direct shorting of the electrodes.

There are openings 65 adjacent to the louvers 66 for ion flow.

Figure 3:
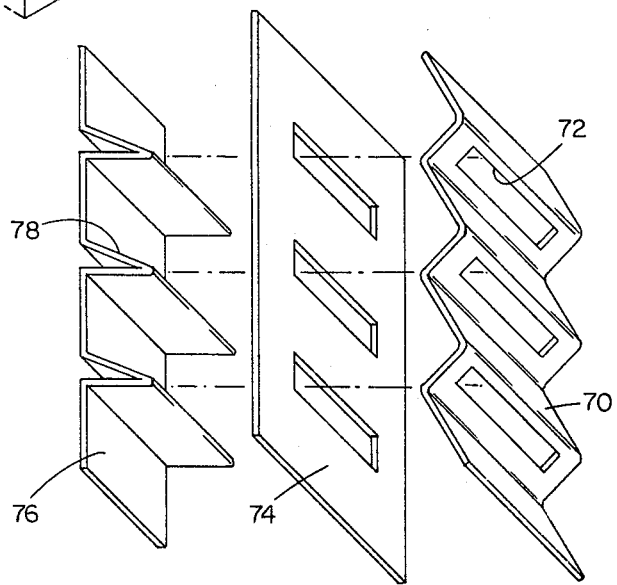
FIG. 3 is an exploded isometric view showing the electrodes package of yet another embodiment of the invention.

FIG. 3 shows another alternate construction for the electrodes in which photoelectrode 70 is undulating and provided with slots 72 (these could be openings of any shape) for ion flow. The slots are positioned at the steepest slope of the undulation to minimize the amount of light which passes through. The counter electrode 76 has transverse extensions 78 which extend through slots 72 toward the light admitting window 22 of the cell container. An insulating spacer 74 and passivation of the slot edges with an insulating material separates the two electrodes to prevent their direct shorting.

Figure 4:
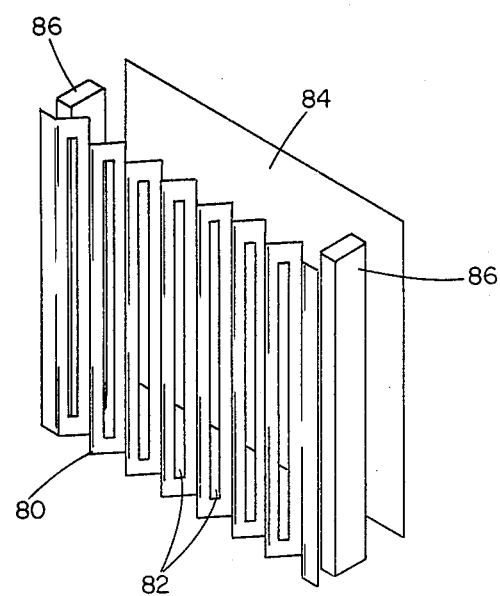
FIG. 4 is an exploded isometric view showing the electrodes package of still another embodiment of the invention.

Another alternate construction for the electrodes is shown in FIG. 4, in which undulating photoelectrode 80 is provided with slots 82 for ion flow to rear-placed (i.e., farther from the window) counter electrode 84. The electrodes are separated by spacers 86. Slots 82 are positioned on the steepest slope of each undulation to minimize the amount of light which passes through each slot.

OPERATION

Referring to FIG. 1, light enters the cell through a light-transmitting window 22; preferably the orientation is such that the light rays are perpendicular to window 22 and light admitting plane 24. The light passes through the electrolyte 20 and strikes the photosensitive semiconductor surface on photoelectrode 14, causing the generation of an electrical current and of an ion flow in the electrolyte. The ions are conducted by the electrolyte, through the openings 38 in the photoelectrode, to the counter electrode 16 and then are extracted from the cell through contact strip 44 as electrical energy.

The surface area of the photoelectrode with louvers 36 is larger (preferably, as in the disclosed embodiment, by a factor of at least 1.3) than the surface area of the light-admitting plane 24 bounded by the container. When the light strikes the louvered photoelectrode, the illumination intensity per unit area is lower by a factor of cosine $\theta$ where $\theta$ is the angle of upward bending of the louver) than the illumination intensity on the light-admitting plane. Thus, the current drain per unit area of photoelectrode surface is reduced and the resulting cell efficiency is increased as compared to a cell with a photoelectrode surface equal to the surface area of the light-admitting plane.

When the cell was exposed to light from a tungsten halogen lamp having an intensity of 15 mWatts/cm$^2$, the cell had an open circuit voltage of 0.46 V, a short circuit current of 275 mAmps, and an overall conversion efficiency of 2.5% based on photoelectrode area in the light-admitting plane.

The construction of the cell, with the photoelectrode arranged to receive light directly from the light-transmitting window 22, maximizes the photoelectrode surface area exposed to the light. The close proximity of the photoelectrode 14 to the counter electrode 16 and the openings 38 in the photoelectrode provide for a short path length for ion flow, thus minimizing resistive losses; and provide for good mixing of the ions which reduces polarization losses on the electrodes.

In FIG. 2 and FIG. 3, where the counter electrode extends through the plane of the photoelectrode, the ion flow path has been minimized.

In FIG. 4, a short ion flow path is provided by the close proximity of the photoelectrode to the counter electrode.

Other embodiments are within the following claims. For example, other semiconductor materials such as GaAs, GaP, InP, CdX (where X is S, Se, Te, or mixtures of these), Zn$_3$P$_2$, WSe$_2$, MoSe$_2$, ZrSe$_2$, and Si may be used. The photoelectrode substrate may be of another material such as stainless steel, Ni, Cr, W, Nb, Ta, Pt, Au, and Pd, and may be in the form of expanded metal, metal mesh, or metal screen. The counter electrode may also be of another material such as metal foils; carbon or graphite foils, weaves, or cloths; or high surface area bonded powdered electrode materials on expanded metal or metal screen supports. Chemical energy may be stored internally by separating the photo- and counter electrodes with a diffusion or ion exchange membrane to prevent or retard oxidized and reduced species, produced on the electrodes, from mixing. The electrolyte may be of any aqueous or nonaqueous solvent containing a reducible and an oxidizable species, and exhibiting satisfactory ionic conductance and suppression of photoelectrode decomposition.

We claim:

1. A photoelectrochemical cell comprising
   a sealed container having a light-transmitting window for admitting light into said container across a light-admitting plane,
   an electrolyte in said container,
   a photoelectrode in said container having a light-absorbing surface arranged to receive light from said window and in contact with said electrolyte, said surface having a plurality of spaced portions oblique to said plane, each said portion having dimensions at least an order of magnitude larger than the maximum wavelength of incident sunlight, the total surface area of said surface being larger than the area of said plane bounded by said container, and
   a counter electrode in said container in contact with said electrolyte,
   said photoelectode being between said window and said counter electrode, having ion-flow openings therethrough, and being louvered to provide said portions and said openings.

2. The cell of claim 1 wherein each of at least a plurality of said portions has a surface area larger than the area of its corresponding said opening.

3. A photoelectrochemical cell comprising
   a sealed container having a light-transmitting window for admitting light into said container across a light-admitting plane,
   an electrolyte in said container,
   a photoelectrode in said container having a light-absorbing surface arranged to receive light from said window and in contact with said electrolyte, said surface having a plurality of spaced portions oblique to said plane, each said portion having dimensions at least an order of magnitude larger than the maximum wavelength of incident sunlight, the total surface area of said surface being larger than the area of said plane bounded by said container, and
   a counter electrode in said container in contact with said electrolyte,
   said counter electrode being laminated to said photoelectrode with electrical insulation therebetween, and said portions being oriented so that at least some of said portions face counter electrode sections laminated to other said portions.

4. A photoelectrochemical cell comprising a sealed container having a light-transmitting window for admitting light into said container across a light-admitting plane, an electrolyte in said container, a photoelectrode in said container having a light-absorbing surface arranged to receive light from said window and in contact with said electrolyte, said surface having a plurality of spaced portions oblique to said plane, each said portion having dimensions at least an order of magnitude larger than the maximum wavelength of incident sunlight, the total surface area of said surface being larger than the area of said plane bounded by said container, and a counter electrode in said container in contact with said electrolyte, said counter electrode being laminated to said photoelectrode with electrical insulation therebetween, and said electrodes having openings therethrough.

5. A photoelectrochemical cell comprising a sealed container having a light-transmitting window for admitting light into said container across a light-admitting plane, an electrolyte in said container, a photoelectrode in said container having a light-absorbing surface arranged to receive light from said window and in contact with said electrolyte, said surface having a plurality of spaced portions oblique to said plane, each said portion having dimensions at least an order of magnitude larger than the maximum wavelength of incident sunlight, the total surface area of said surface being larger than the area of said plane bounded by said container, and a counter electrode in said container in contact with said electrolyte, portions of said counter electrode extending through openings in said photoelectrode and toward said window.

* * * * *